Jan. 23, 1962    E. H. PETERS    3,018,428
FIELD WINDING CONTINUITY CHECK CIRCUITS
Filed April 29, 1960    2 Sheets-Sheet 1
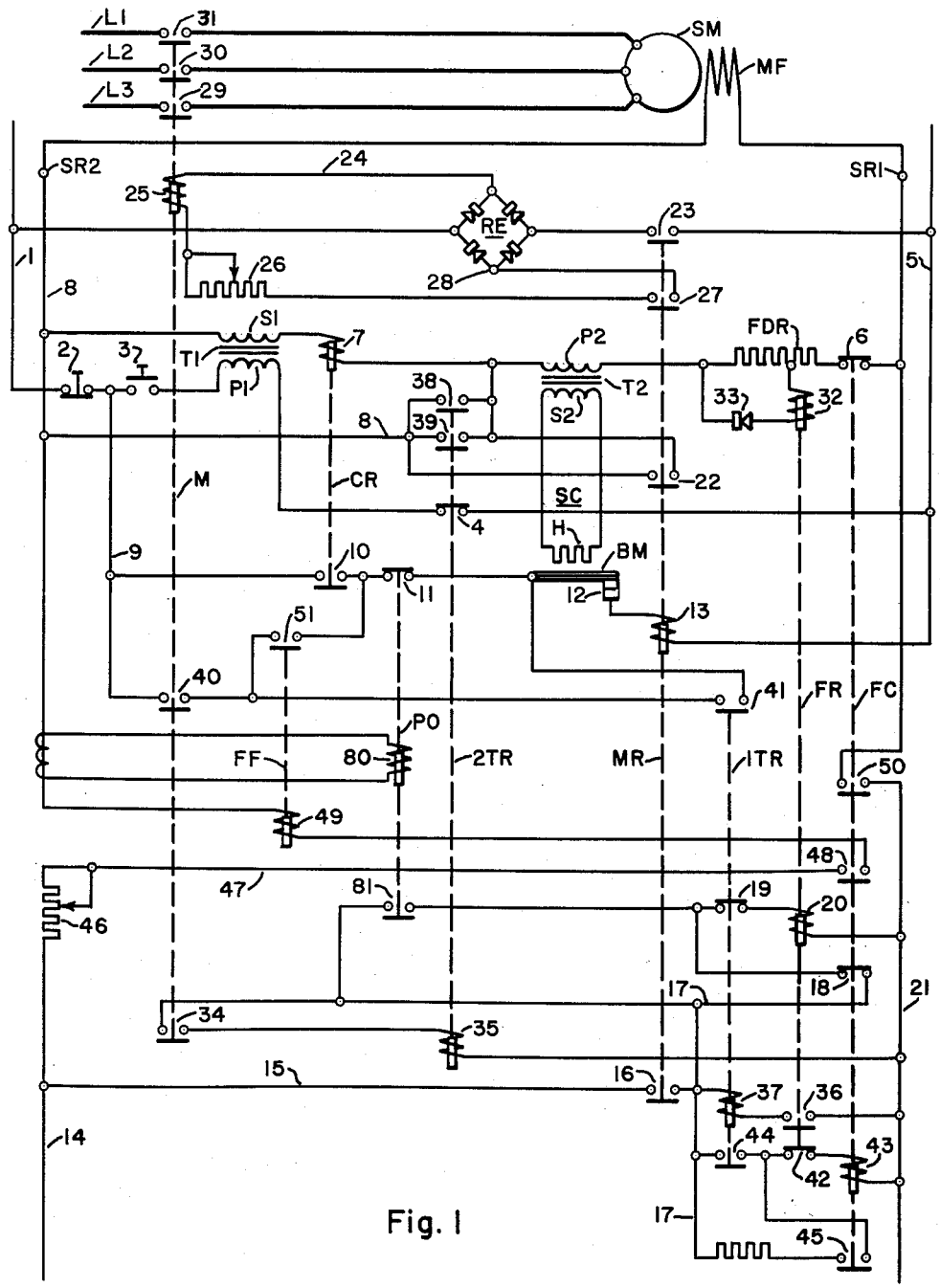
Fig. I
WITNESSES
INVENTOR
Emil H. Peters
BY
ATTORNEY Jan. 23, 1962      E. H. PETERS      3,018,428

FIELD WINDING CONTINUITY CHECK CIRCUITS

Filed April 29, 1960      2 Sheets-Sheet 2

United States Patent Office 3,018,428
Patented Jan. 23, 1962

3,018,428
FIELD WINDING CONTINUITY CHECK
CIRCUITS
Emil H. Peters, Smicksburg, Ind., assignor to Westinghouse Electric Corporation, East Pittsburgh, Pa., a corporation of Pennsylvania
Filed Apr. 29, 1960, Ser. No. 25,763
8 Claims. (Cl. 318—176)

This invention relates to systems of control for electric motors and more particularly to means for protecting the field windings of motors against insulation failure. This invention has general application but is especially useful with synchronous motors.

Synchronous motors and synchronous condensers are commonly started by connecting the primary, or stator, windings to the alternating current supply terminals. This is either a one-step operation by applying full-line voltage directly, or an operation requiring two or more successive voltage steps, with the last step, of course, supplying full-line voltage.

During the period of acceleration from rest to synchronization the damper winding and the field winding are simply acting somewhat like secondaries of a transformer. Since the field winding by its very nature has many turns, the voltage induced in the field winding during the starting period is very high and unless the continuity of the field circuit through the field discharge resistor is maintained, the voltage induced in the field windings will usually rise to a value sufficiently high to damage the field winding insulation, or the insulation of the current collector slip rings, or both. In any event a discontinuity in the field winding circuit is not a safe operation.

To check on the continuity of this circuit and the existence of a suitable source of direct current excitation for the field windings, it is common practice to install a direct current sensitive relay in the excitation circuit to shut the equipment down in the event of an excitation failure. This relay must, however, be kept out of the field winding circuit during the starting period, since during this time there is no direct current flowing in the field winding, but an alternating current is induced in the field winding that varies from line frequency to a very low frequency just before synchronization. This alternating current normally discharges through the discharge resistor with the result that the field winding aids the damper winding in providing the necessary starting torque.

One broad object of this invention is to provide protection for the insulation of the field winding of a motor.

It is also a broad object of this invention to check the continuity of the circuit of the field winding of a synchronous motor.

It is a somewhat more specific object of this invention to automatically check the continuity of the entire field winding and field discharge resistor circuit each time before a synchronous motor, provided with this invention, is started and to prevent the starting of the motor if such a continuity does not exist.

The objects stated are merely illustrative. Other objects and more detailed advantages will become more apparent from a study of this specification and the accompanying drawings, in which:

FIG. 1 shows diagrammatically an embodiment of this invention as applied to a complete synchronous motor starting control;

FIG. 1, at the top, shows the synchronous motor SM having the field winding MF, the circuit continuity of which is to be checked. Possibly the best way to understand this invention is through a study of the starting sequence of a synchronous motor provided with the invention.

Figure 3:
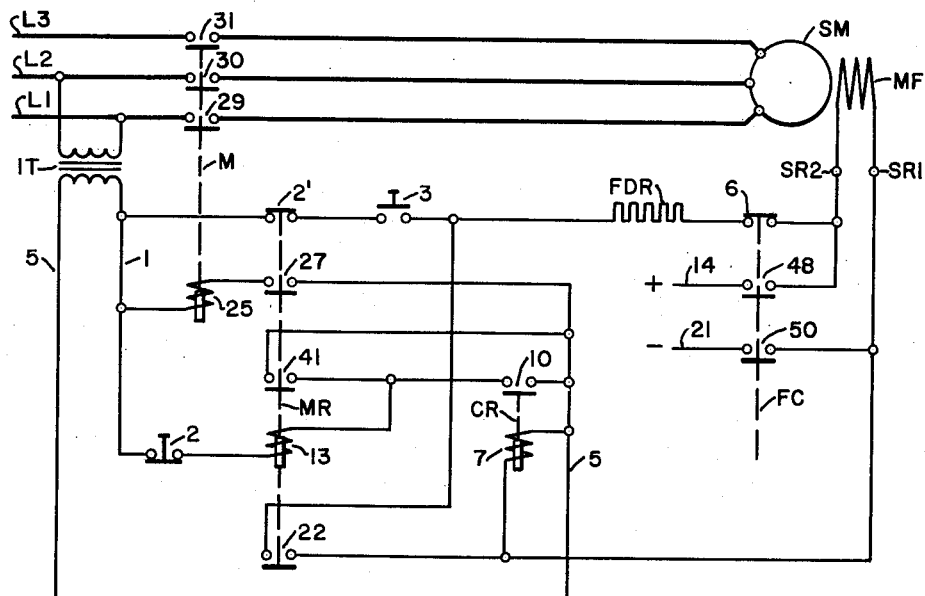
FIG. 3 is a diagrammatic showing of a further modification of this invention.

Assuming that main leads L1, L2 and L3 are energized with three-phase alternating current, that conductors 1 and 5 are energized with single-phase alternating current, which may be from any source as leads L1 and L2 through an isolation transformer IT actually shown in FIG. 3, and that conductors 14 and 21 are energized with direct current.

To start the motor it is essential, with this invention, to check the continuity of the field winding circuit. Operation of the starting switch 3 thus establishes an energizing circuit from conductor 1 through the stop switch 2, starting switch 3, the primary winding P1 of transformer T1, the back contact 4 of the time limit relay 2TR to conductor 5.

Transformer T1 is chosen so that a voltage of sufficient magnitude is produced to energize coil 7 of the control relay CR, provided there is a proper continuity in the field winding circuit, or circuitry. This circuit may be traced from slip ring SR1 through the back contacts 6 of the field contactor FC, the field discharge resistor FDR, primary P2 of transformer T2 for the squirrel cage winding protection circuit SC, actuating coil 7 of control relay CR, secondary winding S1 of transformer T1, conductor 8, slip ring SR2, field winding MF back to slip ring SR1. If there is an open circuit at the slip rings, the brushes being lifted for example, or an open circuit in any other portion of this circuit, then the control relay CR is not actuated and the synchronous motor will not start. The key to proper starting of the synchronous motor is the closure of contacts 10 of the control relay. One of the purposes of the invention will thus have been attained.

Merely to show how this invention fits in with the conventional synchronous motor starting control, without otherwise altering the control, a very brief statement of the rest of the starting sequence will be given.

If contacts 10 close, a circuit is established from the energized conductor 9, through contacts 10 of control relay CR, back contacts 11 of the pull-out protecting circuit PO including the transformer shown and including coil 80 and contacts 11 and 81, contacts 12 of the squirrel cage winding protective circuit SC also including transformer secondary S2, the heater H and bimetal BM, actuating coil 13 of the main relay MR to conductor 5.

Operation of the main relay MR effects the simultaneous closing of contacts 16, 22, 27 and 23. The closure of contacts 16 establishes a circuit from conductor 14 through conductor 15, contacts 16, conductor 17, back contacts 18 on the field contactor FC, back contacts 19 on time limit relay TR1, and the main actuating winding 20 of the field frequency relay FR to conductor 21. The field frequency relay picks up immediately to close contacts 36 and to open contacts 42 to prevent premature operation of the field contactor FC.

Since the field circuit continuity checking circuitry is no longer needed the instant it has served its purpose by energizing the main relay MR, it is taken out of the energizing circuit from leads 1 and 5. This is accomplished by the closure of contacts 22 establishing a shunt circuit from conductor 8 to the right of actuating coil 7. The secondary winding S1 and coil 7 are both shunted, and since the starting switch 3 is opened the moment the continuity of the field circuit has been established as evidenced by the starting of the motor, (discussed more in detail hereinafter) the primary winding P1 is also out of the circuit.

The closure of contacts 27 and 23 establishes a circuit from conductor 1 through the full-wave rectifier RE and contacts 23 to conductor 5, and from the direct current terminals of the rectifier RE a circuit is established through conductor 24, actuating coil 25 of the main contactor M, adjustable resistor 26, contacts 27 to the negative terminal 28 of the rectifier RE.

Energization of coil 25 actuates the main contactor M to close the contacts 29, 30, 31, 34 and 40. Closure of contacts 29, 30 and 31 starts the motor SM. An alternating current is induced in the field winding and, if there is a proper continuity, no dangerous voltages are produced by the field winding. The alternating current of the field winding also traverses winding 32 and rectifier 33 thus holding the armature of this field frequency relay FR in actuated position independent of coil 20.

The closure of contacts 34 establishes a circuit from energized conductor 17 through contacts 34, actuating coil 35 of the time limit relay 2TR to conductor 21. Since contacts 36 are closed, as hereinabove pointed out, the actuating coil 37 of time limit relay 1TR is energized to close contacts 44 and 41 and open contacts 19, and since coil 35 actuates time limit relay 2TR to open its contacts 4 and close its contacts 38 and 39, it is apparent that additional shunt circuits are provided for the secondary S1 and coil 7, that the circuit for primary P1 is opened at contacts 4, and that the main relay MR remains energized from energized conductor 9 through contacts 40, 41 and 12.

As soon as the motor is at the proper speed and the field poles at the proper position for maximum pull-in torque contacts 42 close to energize coil 43 of the field contactor FC through contacts 44. This contactor holds itself in through contacts 45, and closes contacts 48 and 50 to connect the field winding MF to the direct current supply leads 21 and 14. This circuit may be traced from conductor 14, through rheostat 46, conductor 47, contacts 48, coil 49 of the field failure relay FF, elements of the pull-out protective device PO, conductor 8, slip ring SR2, field winding MF, slip ring SR1 and contacts 50, to conductor 21. The contacts 51 of the field failure relay FF close making the energization of the main relay MR independent of contacts 41, but dependent only on contacts 40, 51, 11, 12, and such other contacts, as overload control, etc., as may be placed in this circuit, between coil 13 and conductor 5.

Figure 2:
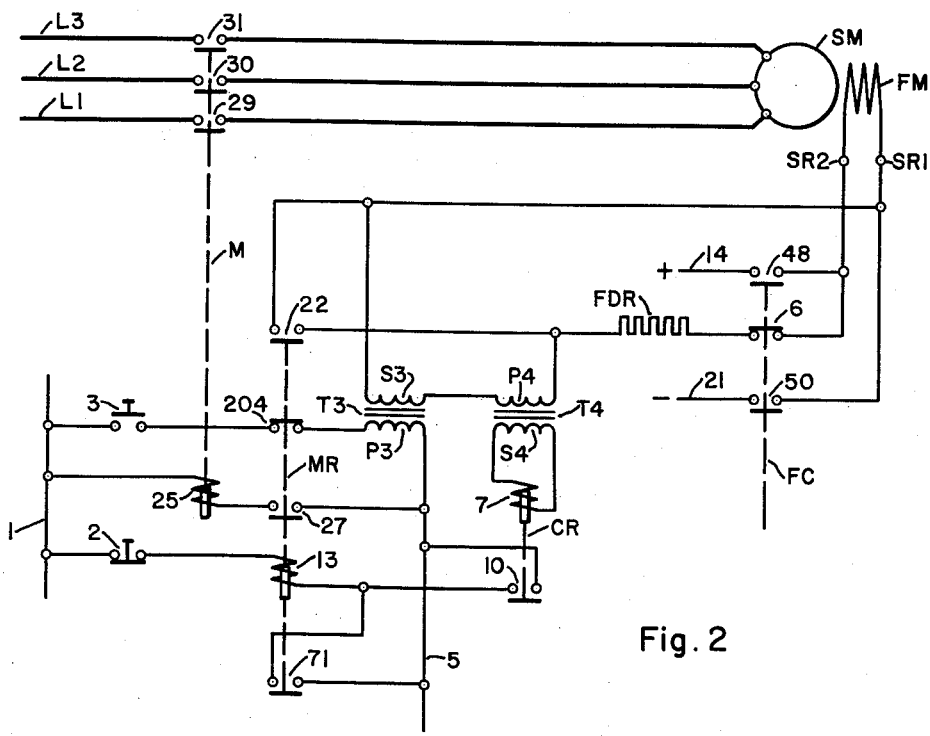
FIG. 2 shows diagrammatically a modification of the invention.

In FIG. 2 a field circuit continuity checking circuitry is shown well adapted to large machines as synchronous condensers. In this case closure of the start push button 3 establishes a circuit from A.C. lead 1 through switch 3, back contacts 204 of the main relay MR, primary P3 of transformer T3 to the A.C. lead 5. The secondary S3, if the field circuit is not open at any point, sends an alternating current through the circuit including secondary S3, primary P4 of transformer T4, field discharge resistor FDR, the back contacts 6 of the field contactor FC, the field winding MF back to secondary S3.

The energization of primary P4 energizes secondary S4 which in turn energizes the coil 7 of the control relay CR. Operation of the control relay CR closes contacts 10 to establish a circuit from conductor 1, through the stop switch 2, coil 13 of the main relay MR, and contacts 10 to lead 5. Relay MR holds itself in through contacts 71 and at contacts 27 establishes a circuit for coil 25 of the main contactor M, which thus closes contacts 29, 30, and 31 to connect the motor to the three-phase leads L1, L2 and L3. The closure of contacts 22 shunts the secondary S3 and the primary P4, and the opening of contacts 204 takes the primary P3 out of the circuit. The synchronizing equipment at this point takes over to close contacts 48 and 50 and open contacts 6 at the proper time.

In FIG. 3 a modification is shown of utility for relatively small synchronous motors. The A.C. leads 1 and 5 are supplied from the isolation transformer IT, and when the switch 3 is actuated, a circuit is established from lead 1, through the back contacts 2' of the main relay MR, switch 3, field discharge resistor FDR, back contacts 6 of the field contactor FC, the field winding MF, and actuating coil 7 of the control relay CR to lead 5.

If there is no break, as a discontinuity in the circuit just traced, the control relay CR will be actuated to close contacts 10 whereupon a circuit is established for coil 13, through switches 2 and 10, for the main relay MR. The main relay holds itself in through contacts 41 and establishes an energizing circuit for coil 25 through contacts 27, and establishes a shunt circuit for coil 7 through contacts 22 and also maintains the discharge circuit for the field winding through contacts 22. The contacts 2' open to disconnect the A.C. supply to the field winding. The energization of coil 25 effects the operation of the main contactor M to thus, through contacts 29, 30 and 31, connect the stator of the motor to the three-phase supply leads L1, L2, and L3. The synchronizing apparatus now takes over to effect the closing of contacts 48 and 50 at the right time and the opening of contacts 6 at the right time.

While but three embodiments of this invention have been disclosed all applied to a synchronous motor, other modifications and embodiments not associated with a synchronous motor falling within the spirit of this invention are meant to be included.

I claim as my invention:

1. In an electric system of control for a synchronous motor, in combination, a source of alternating current for the stator winding of the motor; a source of direct current for the field winding of the motor; and synchronous motor starting means including, among other elements, a main contactor and a field contactor, and which synchronous starting means, when energized, first effects through the main contactor the connection of the stator winding to the source of alternating current and, thereafter, when the proper speed condition of the rotor of the motor has been attained for proper synchronization, to connect the field winding, by means of said field contactor, to the source of direct current; a source of potential, switching means for connecting the source of potential to the field winding circuitry of the synchronous motor to cause an electric current to flow in said circuitry, means responsive to the current caused to flow in said circuitry for energizing the synchronous motor starting means, and means, responsive to the actuation of the synchronous motor starting means, for disconnecting the source of potential from the field winding.

2. In an electric system of control for a synchronous motor, in combination, a source of alternating current for the stator winding of the motor; a source of direct current for the field winding of the motor; and synchronous motor starting means including, among other elements, a main contactor and a field contactor, and which synchronous starting means, when energized, first effects through the main contactor the connection of the stator winding to the source of alternating current and, thereafter, when the proper speed condition of the rotor of the motor has been attained for proper synchronization, to connect the field winding, by means of said field contactor, to the source of direct current; a source of potential, control means for checking the continuity of the field winding circuitry, which field winding circuitry includes all the elements on the field winding side of the field contactor and means for connecting the source of potential in a loop circuit with said field winding circuitry to cause a current to flow in said loop circuit, if there be no discontinuity in the loop circuit, said control means, being connected to be responsive to the current caused to flow in the loop circuit, cause the energization of said synchronous motor starting means.

3. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, control means for checking the continuity of the field winding circuitry, which field winding circuitry includes all the elements on the field winding side of the field contactor which elements include in a loop circuit, the field winding, the slip rings and brushes, the normally closed contacts of the field contractor which normally closed contacts connect the field discharge resistor in the loop circuit while the motor is at standstill as well as during acceleration of the synchronous motor during starting, and means for connecting the source of potential in the loop circuit to cause a current to flow in said loop circuit, if there be no discontinuity in the loop circuit, said control means, being responsive to the current caused to flow in the loop circuit, cause the energization of said synchronous motor starting means.

4. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, control means for checking the continuity of the field winding circuitry, which field winding circuitry includes all the elements on the field winding side of the field contactor which elements include in a loop circuit, the field winding, the slip rings and brushes, the normally closed contacts of the field contactor which normally closed contacts connect the field discharge resistor in the loop circuit while the motor is at standstill as well as during acceleration of the synchronous motor during starting, means for connecting the source of potential in the loop circuit to cause a current to flow in said loop circuit, if there be no discontinuity in the loop circuit, said control means, being responsive to the current caused to flow in the loop circuit, cause the energization of said synchronous motor starting means and means, responsive to the actuation of the synchronous motor starting means, for disconnecting the source of potential from the field winding circuitry.

5. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, said source of potential comprising a transformer having a primary, connected to suitable terminals energized with alternating current, and having a secondary winding, control means for checking the continuity of the field winding circuitry, which field winding circuitry includes all the elements on the field winding side of the field contactor, which elements include in a loop circuit the field winding, the slip rings and brushes, the normally closed contacts of the field contactor, and the field discharge resistor, a control relay having an actuating coil, said actuating coil and transformer secondary being connected in the loop circuit when starting of the motor is initiated whereby an alternating current is caused to flow in the loop circuit, if there be no discontinuity in the loop circuit, to cause operation of the control relay, and switching means actuated by the control relay to cause energization of the synchronous motor starting means.

6. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, said source of potential comprising a transformer having a primary, connected to suitable terminals energized with alternating current, and having a secondary winding, control means for checking the continuity of the field winding circuitry, which field winding circuitry includes all the elements on the field winding side of the field contactor, which elements include in a loop circuit, the field winding, the slip rings and brushes, the normally closed contacts of the field contactor, and the field discharge resistor, a control relay having an actuating coil, said actuating coil and transformer secondary being connected in the loop circuit when starting of the motor is initiated whereby an alternating circuit is caused to flow in the loop circuit, if there be no discontinuity in the loop circuit, to cause operation of the control relay, and switching means actuated by the control relay to cause energization of the synchronous motor starting means and means responsive to the operation of the motor starting means for shunting the transformer secondary winding and actuating coil of the control relay and the opening of the circuit of the transformer primary winding.

7. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, said source of potential comprising a transformer having a primary, connected to suitable terminals energized with alternating current, and having a secondary winding, control means for checking the continuity of the field winding circuitry, which field winding circuitry includes all the elements on the field winding side of the field contactor, which elements include in a loop circuit, the field winding, the slip rings and brushes, the normally closed contacts of the field contactor, and the field discharge resistor, a second transformer having a primary winding connected in the loop circuit, and having a secondary winding, a control relay having an actuating coil connected to the secondary winding of the second transformer, said secondary winding of the first transformer being also connected in the loop circuit when the starting of the motor is initiated whereby an alternating current is caused to flow in the loop circuit, if there be no discontinuity in the loop circuit, to cause operation of the control relay through the second transformer, and switching means actuated by the control relay to cause energization of the synchronous motor starting means.

8. In an electric system of control for a synchronous motor, in combination, a source of alternating current for the stator winding of the motor; a source of direct current for the field winding of the motor; and synchronous motor starting means which, when energized, first effects the connection of the stator winding to the source of alternating current and, thereafter, when the proper speed condition of the rotor of the motor has been attained for proper synchronization, to connect the field winding by means of a field connector to the source of direct current; a source of potential, said source of potential comprising a transformer having a primary, connected to suitable terminals energized with alternating current, and having a secondary winding, control means for checking the continuity of the field winding circuitry, which field winding circuitry includes all the elements on the field winding side of the field contactor which elements include in a loop circuit, the field winding, the slip rings and brushes, the normally closed contacts of the field contactor, and the field discharge resistor, a second transformer having a primary winding connected in the loop circuit, and having a secondary winding, a control relay having an actuating coil connected to the secondary winding of the second transformer, said secondary winding of the first transformer being also connected in the loop circuit when the starting of the motor is initiated whereby an alternating current is caused to flow in the loop circuit, if there be no discontinuity in the loop circuit, to cause operation of the control relay through the second transformer, and switching means actuated by the control relay to cause energization of the synchronous motor starting means and means responsive to the operation of the motor starting means for shunting the secondary winding of the first transformer and the primary winding of the second transformer and opening the circuit of the primary winding of the first transformer.

References Cited in the file of this patent

UNITED STATES PATENTS

| | | |
|---|---|---|
| 1,551,400 | Jones | Aug. 25, 1925 |
| 1,991,098 | Kahn et al. | Feb. 12, 1935 |